US012447603B2

(12) United States Patent
Xiong et al.

(10) Patent No.: US 12,447,603 B2
(45) Date of Patent: Oct. 21, 2025

(54) PASSIVE EXOSKELETON BASED ON ENERGY FLOW CHARACTERISTICS OF FOOT-ANKLE COMPLEX

(71) Applicant: HUAZHONG UNIVERSITY OF SCIENCE AND TECHNOLOGY, Hubei (CN)

(72) Inventors: Cai-Hua Xiong, Hubei (CN); Tao Wang, Hubei (CN); Di Hu, Hubei (CN); Jie jun yi Liang, Hubei (CN); Yuhao Li, Hubei (CN); Tian-Cheng Zhou, Hubei (CN); Wen-Bin Chen, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 746 days.

(21) Appl. No.: 17/864,338

(22) Filed: Jul. 13, 2022

(65) Prior Publication Data
US 2023/0150114 A1    May 18, 2023

(30) Foreign Application Priority Data
Nov. 18, 2021    (CN) .......................... 202111371485.1

(51) Int. Cl.
*B25J 9/00*    (2006.01)
*A61H 1/02*    (2006.01)
*A61H 3/00*    (2006.01)

(52) U.S. Cl.
CPC .......... *B25J 9/0006* (2013.01); *A61H 1/0266* (2013.01); *A61H 2003/007* (2013.01);
(Continued)

(58) Field of Classification Search
CPC ... B25J 9/0006; B25J 9/109; B25J 9/10; B25J 17/00; A61H 1/0237–0266;
(Continued)

(56) References Cited

U.S. PATENT DOCUMENTS 9,492,302 B2 *    11/2016    Wiggin ................. A61F 5/0127
2019/0015286 A1 *    1/2019    Glaister ................. A61F 2/604
(Continued)

FOREIGN PATENT DOCUMENTS

CN    102368923 A  *  3/2012    ........... A43B 7/1425
CN    111956458 A  *  11/2020    ............... A61H 3/00

OTHER PUBLICATIONS

CN 102368923 Machine translation (Year: 2012).*
CN 111956458 machine translation (Year: 2020).*

*Primary Examiner* — Victoria Murphy
*Assistant Examiner* — Sara K Toich
(74) *Attorney, Agent, or Firm* — JCIPRNET (57) ABSTRACT

A passive exoskeleton based on energy flow characteristics of a foot-ankle complex includes a first passive exoskeleton. The first passive exoskeleton includes an energy distribution mechanism, a strike-recipient mechanism and a wearing fixing assembly. The energy distribution mechanism is connected to the strike-recipient mechanism, and the energy distribution mechanism is also connected to the wearing fixing assembly. The energy distribution mechanism includes a ratchet wheel shaft, a left torsional spring, a right torsional spring and a middle guide wheel respectively sleeved on the ratchet wheel shaft. The middle guide wheel is connected to the wearing fixing assembly through an ankle joint power-assisted cord. The ratchet wheel shaft is connected to the strike-recipient mechanism, the strike-recipient mechanism drives the ratchet wheel shaft to rotate, and the ratchet wheel shaft drives the left torsional spring, (Continued)

the right torsional spring and the middle guide wheel to rotate.

10 Claims, 9 Drawing Sheets

(52) U.S. Cl.
CPC .. *A61H 2201/1284* (2013.01); *A61H 2201/14* (2013.01); *A61H 2201/1642* (2013.01)

(58) Field of Classification Search
CPC ......... A61H 2201/14; A61H 3/00; A61F 2/66; A61F 2/6607
See application file for complete search history.

(56) References Cited

U.S. PATENT DOCUMENTS

| | | | |
|---|---|---|---|
| 2019/0125613 A1* | 5/2019 | Kim | A61H 3/00 |
| 2021/0259872 A1* | 8/2021 | Kim | A61H 1/0266 |
| 2021/0298925 A1* | 9/2021 | Dehez | A61F 2/68 |
| 2022/0218551 A1* | 7/2022 | Ding | A61H 1/0266 |
| 2022/0287904 A1* | 9/2022 | Gloger | A61H 3/008 |

\* cited by examiner

0% gait

FIG. 3(a)

12% gait

FIG. 3(b)

36% gait

FIG. 3(c)

45% gait

FIG. 3(d)

61% gait

PASSIVE EXOSKELETON BASED ON ENERGY FLOW CHARACTERISTICS OF FOOT-ANKLE COMPLEX

CROSS-REFERENCE TO RELATED APPLICATION

This application claims the priority benefit of China application no. 202111371485.1, filed on Nov. 18, 2021. The entirety of the above-mentioned patent application is hereby incorporated by reference herein and made a part of this specification.

BACKGROUND

Technical Field

The disclosure belongs to the technical field of lower extremity exoskeletons, and more particularly, relates to a passive exoskeleton based on energy flow characteristics of a foot-ankle complex.

Description of Related Art

With the development of society and the advancement of science and technology, people begin to pursue the use of external devices to assist the arduous and complex work encountered in daily life. As a human wearable device, exoskeleton is a new type of robot that integrates gait analysis, mechatronics, biomechanics and technologies of many other fields. Exoskeleton may be widely used in military, medical and elderly assistance. In the military field, exoskeleton may improve the combat capability of individual soldiers and normal walking distance, enhance the load-bearing capacity. In the medical field, exoskeleton may help patients to walk with healthy gait and assist disabled people to walk. In the field of elderly assistance, exoskeleton may assist the elderly, who have physical disability due to old age, to travel.

Walking is one of the most common daily activities of human beings. The development of various means of transportation facilitates people's travel. However, due to the restrictions of various terrains, people still need to rely on walking about 10,000 steps per day on average for transportation. Walking is inevitable in people's daily life. Among the joints of the human body, the ankle joint is the joint closest to the ground, and bears almost the entire body weight of the human body, especially when a person is jumping, running and carrying weight, the ankle joint bears a considerable level of impact and loads. In addition, in the process of walking, the ankle joint of human body does the most work among various joints of the lower limb, accounting for nearly 50% of work. At present, the major ankle joints are active exoskeletons. Active exoskeletons tend to be heavier in system, which brings greater additional consumption to users, and active exoskeletons are also constrained by electricity, while passive exoskeletons are relatively light and the reliability is high. Passive exoskeletons utilize the law of human walking to cleverly collect energy for power assistance, the energy utilization rate is improved, and the walking energy consumption is reduced, and has excellent interpersonal coordination. Therefore, passive exoskeletons have received extensive attention.

For human body, during the process of walking, during the heel-strike phase impact is generated between heel and the ground, which causes energy to flow. When human body pushes off from the ground, the ankle joint makes the largest power and does external work, providing the major source of power for the human body to move forward. Therefore, the use of exoskeletons to reduce the impact energy loss in the stepping phase and the energy output provided by the ankle joint during the push-off phase during walking may effectively improve the walking efficiency of the human body and reduce the metabolic consumption caused by walking.

SUMMARY

In view of the above defects or the needs for improvement in the conventional technology, the present disclosure provides a passive exoskeleton based on energy flow characteristics of a foot-ankle complex. The passive exoskeleton may realize time-division regulation, reduce the impact energy loss during the heel-strike phase of the human walking, and at the same time provide assistive moment for the ankle joint during the push-off phase, reduce the energy output from the ankle joint plantarflexors, thereby effectively improving the walking efficiency of the human body, and reducing the metabolic consumption caused by walking.

In order to achieve the above purpose, in an aspect of the present disclosure, a passive exoskeleton based on the energy flow characteristics of the foot-ankle complex is provided. The passive exoskeleton includes a first passive exoskeleton, and the first passive exoskeleton includes an energy distribution mechanism, a strike-recipient mechanism and a wearing fixing assembly. The energy distribution mechanism is connected to the strike-recipient mechanism, and the energy distribution mechanism is also connected to the wearing fixing assembly. When in use, the wearing fixing assembly is fixed on the calf of the human body, and the strike-recipient mechanism is fixed on the foot of the human body. The strike-recipient mechanism deforms with the walking gait of the person and collects the negative work generated during the heel-strike phase. The energy distribution mechanism includes a ratchet wheel shaft, a left torsional spring, a right torsional spring and a middle guide wheel respectively sleeved on the ratchet wheel shaft. The middle guide wheel is connected to the wearing fixing assembly through an ankle joint power-assisted cord. The ratchet wheel shaft is connected to the strike-recipient mechanism, the strike-recipient mechanism drives the ratchet wheel shaft to rotate, and the ratchet wheel shaft drives the left torsional spring, the right torsional spring and the middle guide wheel to rotate. The left torsional spring and the right torsional spring store the energy transmitted by the strike-recipient mechanism through elastic deformation and release the stored energy through elastic recovery to assist the ankle joint to push-off.

Further, the energy distribution mechanism includes a left connecting plate, a right connecting plate, a left foot guide wheel, a right foot guide wheel, a ratchet wheel, a left torsional spring baffle and a right torsional spring baffle. Two ends of the ratchet wheel shaft respectively pass through the left connecting plate and the right connecting plate. The left foot guide wheel, the left connecting plate, the left torsional spring, the middle guide wheel, the ratchet wheel, the right torsional spring baffle, the right torsional spring, the right connecting plate and the right foot guide wheel are sequentially sleeved on the ratchet wheel shaft along the axial direction of the ratchet wheel shaft.

Further, the left foot guide wheel and the right foot guide wheel are connected to the strike-recipient mechanism respectively through the left foot energy storage cord and the right foot energy storage cord, and the strike-recipient mechanism is a symmetrical structure.

Moreover, the strike-recipient mechanism includes a reinforced carbon tube, a heel connecting frame, rear foot frames, slider connecting rods and connecting cranks. The two rear foot frames are arranged at intervals and are respectively connected to the left connecting plate and the right connecting plate. Two ends of the reinforced carbon tube are respectively connected to the two rear foot frames. Two ends of the heel connecting frame are also respectively connected to the two rear foot frames. Middle portions of the two connecting cranks are respectively and rotatably connected to middle portions of the two rear foot frames, one ends of the two connecting cranks are respectively connected to the left foot energy storage cord and the right foot energy storage cord, and the other ends of the two connecting cranks are respectively and rotatably connected to one ends of the two slider connecting rods. The other ends of the two slider connecting rods are respectively and rotatably connected to one ends of the two rear foot frames away from the reinforced carbon tube.

Furthermore, the reinforced carbon tube and the heel connecting frame are connected to shoe.

Moreover, the energy distribution mechanism further includes a detent, a detent, a pawl stopper, and a pawl shaft. Two ends of the pawl shaft are respectively connected to the left connecting plate and the right connecting plate. The pawl stopper is fixed on the pawl shaft. The pawl is rotatably arranged on the pawl shaft, and one end of the detent is connected to the pawl stopper, while the other end of the detent is movably connected to one end of the detent. The other end of the detent is detachably connected to the ratchet wheel. The detent engages or is disengaged from the ratchet wheel to make the ratchet wheel to be in a locked state or an open state. When the ratchet wheel is in a locked state, the ratchet wheel is rotatable unidirectionally, and when the ratchet wheel is in an open state, the ratchet wheel is rotatable bidirectionally.

In addition, the pawl stopper is Z-shaped, one end of the pawl stopper is fixed on the pawl shaft, and the other end of the pawl stopper is connected to the detent. The detent is elastically deformed to limit the position of the pawl.

Moreover, the detent includes a detent housing, a detent thimble, and a detent spring. One end of the detent housing is connected to one end of the pawl stopper away from the pawl shaft. One end of the detent spring is connected to the detent housing, the other end of the detent spring is connected to one end of the detent thimble, and the other end of the detent thimble protrudes out of the detent housing and is movably connected to the pawl.

Additionally, the pawl includes a pawl body, a pawl restore cord connector, a pawl pushing curved surface body and a pawl position-limiting protrusion. One end of the pawl body is rotatably connected to the pawl shaft, and the pawl pushing curved surface body is arranged on the other end of the pawl body and faces the ratchet wheel. The pawl position-limiting protrusion is arranged on the pawl pushing curved surface body. The pawl body is detachably connected to the ratchet wheel. The pawl restore cord connector is connected to one end of the pawl restore cord, and the other end of the pawl restore cord is connected to the ratchet wheel.

Further, a ratchet wheel claw and a ratchet wheel restore cord connector are arranged at intervals on the same side of the ratchet wheel. The other end of the pawl restore cord is connected to the ratchet wheel restore cord connector, and the ratchet wheel claw is detachably connected to the pawl pushing curved surface body. The wearing fixing assembly is a symmetrical structure, and two opposite sides of the wearing fixing assembly are respectively and rotatably connected to the left connecting plate and the right connecting plate.

In general, comparing the above technical solutions conceived by the present disclosure with the conventional technology, the passive exoskeleton based on the energy flow characteristics of the foot-ankle complex provided by the present disclosure mainly has the following advantages:

1. The strike-recipient mechanism deforms with the walking gait of the person and collects the negative work generated during the heel-strike phase, which reduces the impact on the human body during the heel-strike phase. In the meantime, the negative work generated when the ankle joint is dorsiflexed is collected continuously through the ankle joint power-assisted cord, thereby realizing collection of energy of the main negative work section of the foot-ankle complex in the whole walking process of human body.

2. The left torsional spring and the right torsional spring twist to store the energy transmitted by the strike-recipient mechanism and release the stored energy through elastic recovery to assist the ankle joint to push-off. Through the energy distribution mechanism, optimization of the walking energy of the human body is realized. The positive work done by the ankle joint of the human body is reduced, and the walking efficiency of the human body is improved.

3. The ratchet wheel is switched between the locked state and the open state by making the pawl to engage or disengage from the ratchet wheel. When the ratchet wheel is in the locked state, the ratchet wheel is rotatable unidirectionally, and when the ratchet wheel is in the open state, the ratchet wheel is rotatable bidirectionally, so that the adjustment of the working state may be easily realized, and the energy distribution mechanism may distribute the energy in real time.

4. The passive exoskeleton has a simple structure and is easy to manufacture, which allows for popularization and application of the passive exoskeleton.

DESCRIPTION OF THE EMBODIMENTS

In order to make the purpose, technical solutions and advantages of the present disclosure clearer, the present disclosure will be further described in detail below with reference to the accompanying drawings and embodiments. It should be understood that the specific embodiments described herein are only used to explain the present disclosure, but not to limit the present disclosure. In addition, the technical features involved in the various embodiments of the present disclosure described below may be combined with each other as long as they do not conflict with each other.

Please refer to FIG. 1, FIG. 2, and FIGS. 3(a) to 3(e), the present disclosure provides a passive exoskeleton based on energy flow characteristics of a foot complex. The passive exoskeleton includes a first passive exoskeleton and a second passive exoskeleton. When in use, the first passive exoskeleton and the second passive exoskeleton are respectively worn on the left foot and the right foot of human body, and are connected to the human calf through a velcro strap. Meanwhile, the first passive exoskeleton and the second passive exoskeleton are in mirror relationship with each other.

Figure 2:
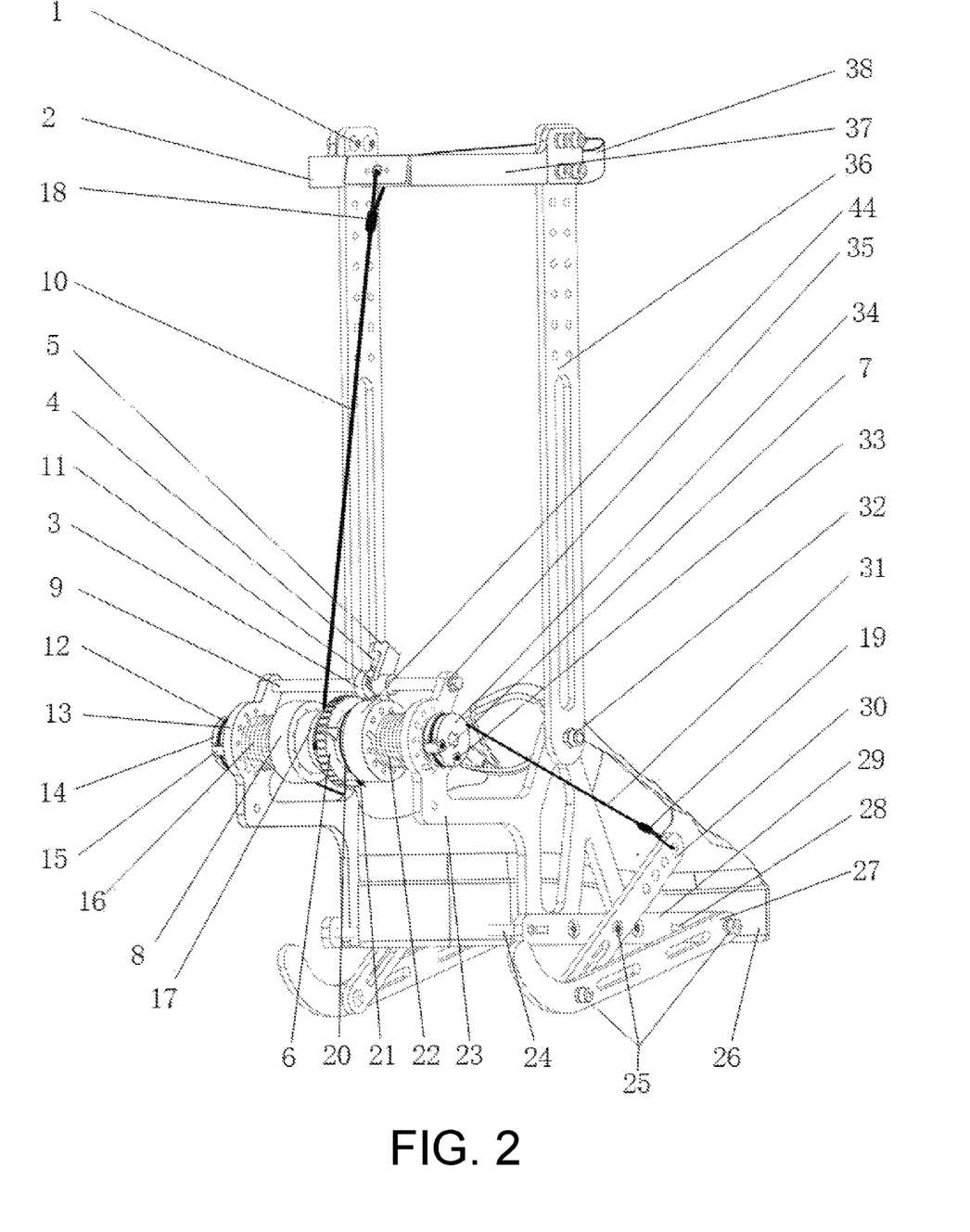
FIG. 2 is a schematic perspective diagram of a passive exoskeleton based on energy flow characteristics of a foot-ankle complex according to the present disclosure.
Figure 3A:
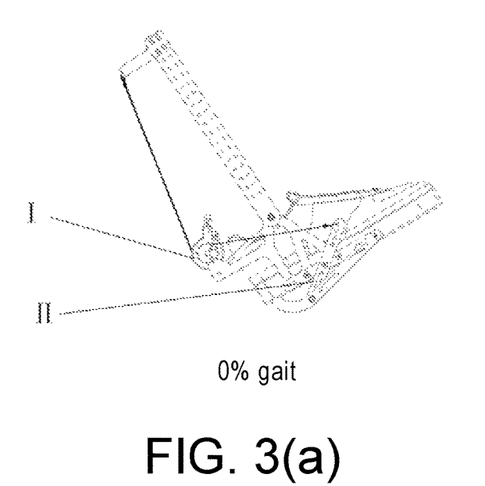
FIG. 3(a), FIG. 3(b), FIG. 3(c), FIG. 3(d), and FIG. 3(e) are diagrams showing the states of different gait cycles respectively.
Figure 3B:
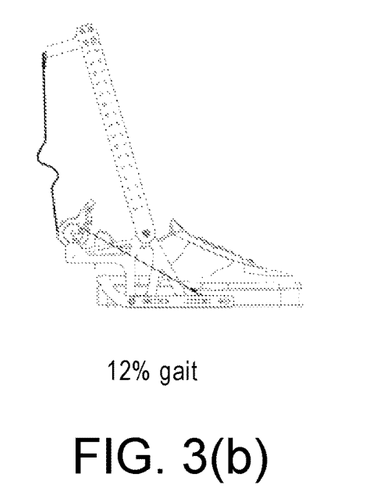
Figure 3C:
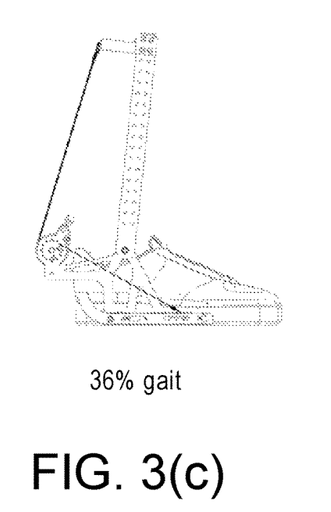
Figure 3D:
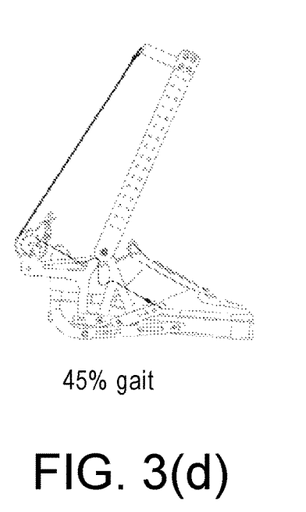
Figure 3E:
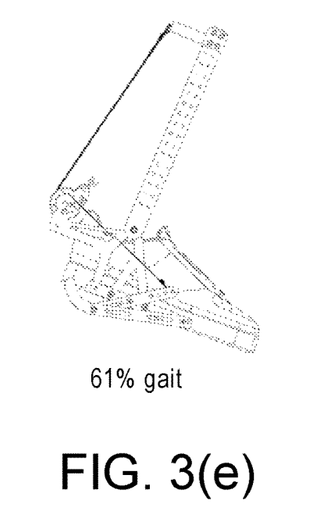

The first passive exoskeleton includes an energy distribution mechanism I, a strike-recipient mechanism II, and a wearing fixing assembly. The energy distribution mechanism I is connected to the strike-recipient mechanism II, the wearing fixing assembly is connected to the strike-recipient mechanism II, and the wearing fixing assembly is configured to fix the first passive exoskeleton on the human calf.

Figure 4:
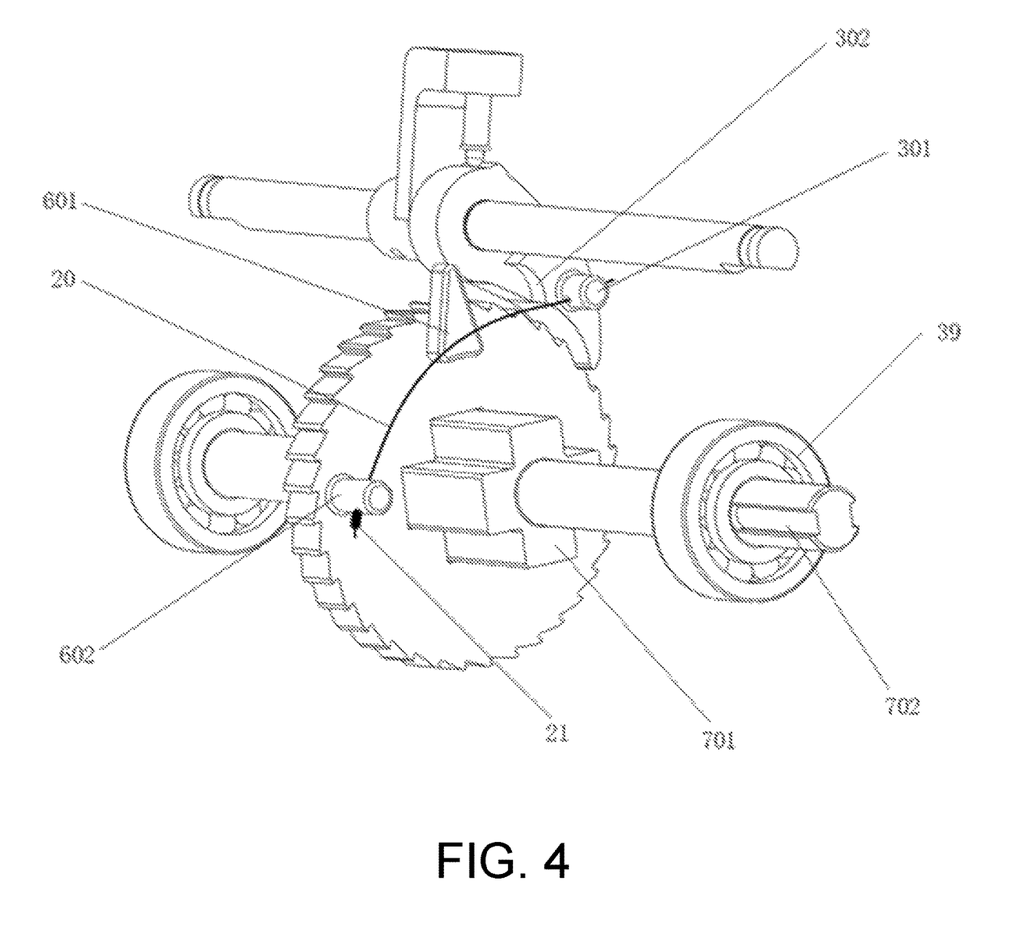
FIG. 4 is a partial schematic diagram of an energy distribution mechanism of the passive exoskeleton based on energy flow characteristic of the foot-ankle complex in FIG. 2.
Figure 5:
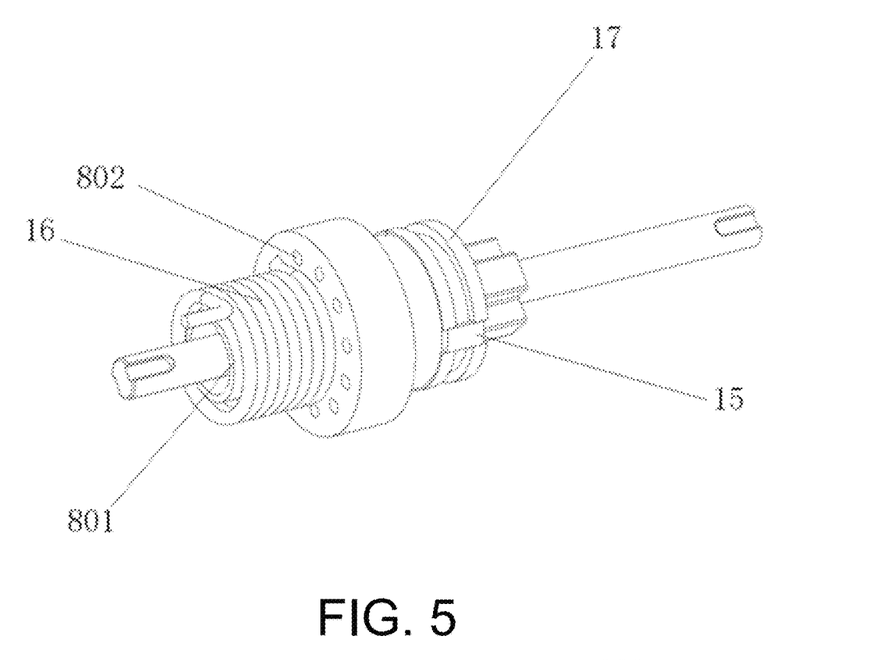
FIG. 5 is another partial schematic diagram of an energy distribution mechanism of the passive exoskeleton based on energy flow characteristic of the foot-ankle complex in FIG. 2.
Figure 6:
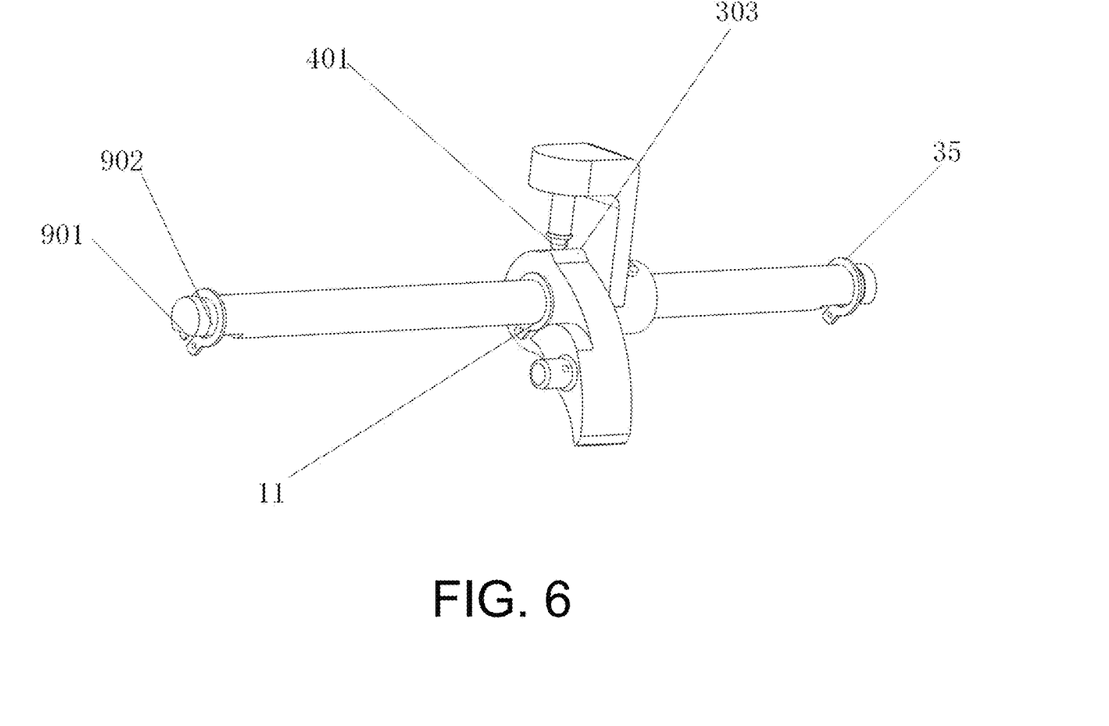
FIG. 6 is a schematic diagram of a locking assembly of an energy distribution mechanism of the passive exoskeleton based on energy flow characteristic of the foot-ankle complex in FIG. 2.

Please refer to FIG. 4, FIG. 5, and FIG. 6, the energy distribution mechanism I includes an energy storage assembly, a guide wheel assembly, a fixing assembly and a locking assembly. The guide wheel assembly includes a baffle 15, a middle guide wheel 17, a left foot guide wheel 14, a right foot guide wheel 34 and a baffle screw 33. By means of guide wheel assembly, the linear displacement during the heel-strike phase can be transmitted to the rotation angular displacement in the energy distribution mechanism I. The energy storage assembly includes the left torsional spring 16, the left torsional spring baffle 8, the right torsional spring 22, and the right torsional spring baffle 44, which are configured to store the energy generated during the heel-strike phase of human walking. The fixing assembly includes the left connecting plate 13, the right connecting plate 23, the ratchet wheel bearing 39, and the ratchet wheel shaft 7, which are configured to fix the energy distribution mechanism 1 on the rear and upper part of the shoes 26. The locking assembly includes the ratchet wheel 6, the pawl 3, the detent 4, the pawl stopper 5, and the pawl shaft 9, which are configured for locking the stored energy.

The opposite ends of the ratchet wheel shaft 7 pass through the left connecting plate 13 and the right connecting plate 23 respectively. The left connecting plate 13 and the right connecting plate 23 are respectively provided with bearing holes. Two ratchet wheel bearings 39 are respectively arranged in the bearing holes of the left connecting plate 13 and the right connecting plate 23. Two ends of the ratchet wheel shaft 7 pass through the two ratchet wheel bearings 39 respectively. The ratchet wheel bearing 39 is an interference fit with the corresponding bearing hole.

A rectangular spline 701 is formed in the middle of the ratchet wheel shaft 7, and U-shaped grooves 702 of the ratchet wheel shaft are respectively formed at two ends of the ratchet wheel shaft 7. The middle guide wheel 17 is fixed on the rectangular spline 701 through a rectangular spline groove. The baffle 15 is fixed on the middle guide wheel 17, the left foot guide wheel 14, and the right foot guide wheel 34 respectively through the baffle screw 33. The outer circumference of the middle guide wheel 17, the left foot guide wheel 14 and the right foot guide wheel 34 is provided with a cord groove with a width greater than the diameter of the cord. One end of the ankle joint power-assisted cord 10 is wound around the cord groove of the middle guide wheel 17, and passes through the corresponding baffle 15. The ankle joint power-assisted cord 10 is fixed on one side of the baffle 15. One ends of the two foot energy storage cords 31 are respectively wound in the cord grooves of the left foot guide wheel 14 and the right foot guide wheel 34, and passes through the corresponding baffle 15, so as to fix one end of the energy storage cord 31 on one side of the baffle 15. The left foot guide wheel 14 and the right foot guide wheel 34 are respectively fixed in the U-shaped grooves 702 of the two ratchet wheel shaft, and then fixed on the ratchet wheel shaft 7, so as to transmit the force applied thereon to the ratchet wheel shaft 7.

The left torsional spring baffle 8 and the right torsional spring baffle 44 cooperate with each other through the rectangular spline groove and the rectangular spline 701 respectively to be fixed on the ratchet wheel shaft 7. The left torsional spring baffle 8 and the right torsional spring baffle 44 are fixed in the axial direction of the ratchet wheel shaft 7 through the depth of the rectangular spline groove. One end of the left torsional spring baffle 8 facing the left foot guide wheel 14 is formed with a torsional spring position-limiting shaft end 801, and one side of the right torsional spring baffle 44 facing the right connecting plate 23 is formed with the torsional spring position-limiting shaft end 801. One end of the left torsional spring 16 and the right torsional spring 22 is respectively disposed on the torsional spring position-limiting shaft end 801. The left torsional spring baffle 8 is provided with evenly arranged torsional spring fixing holes 802, one end of the left torsional spring 16 is fixed in the torsional spring fixing hole 802, and the other end of the left torsional spring 16 is fixed in the torsional spring fixing hole of the left connecting plate 13. In this embodiment, the left torsional spring 16 and the right torsional spring 22 have opposite directions of rotation, have the same rigidity, and are distributed in mirror images. The angle between the interval of the two adjacent torsional spring fixing holes 802 is 30°. Two ends of the right torsional spring 22 are respectively fixed in the torsional spring fixing hole of the right torsional spring baffle 44 and the torsional spring fixing hole of the right connecting plate 23.

The ratchet wheel 6 is fixed on the ratchet wheel shaft 7 through the cooperation of the rectangular spline groove and the rectangular spline 701. The left foot guide wheel 14, the left connecting plate 13, the left torsional spring 16, the left torsional spring baffle 8, the middle guide wheel 17, the ratchet wheel 6, the right torsional spring baffle 44, the right torsional spring 22, the right connecting plate 23, and the right foot guide wheel 34 are arranged in sequence along the axial direction of the ratchet wheel shaft 7.

The pawl 3 is provided with a through hole with a diameter larger than the shaft diameter of the pawl shaft 9, and the pawl shaft 9 passes through the through hole. The pawl 3 limits the movement of the pawl 3 along the axial direction of the pawl shaft 9 through the pawl positioning circlip 11, and the pawl 3 may rotate around the pawl shaft 9. The pawl stopper 5 is arranged on the pawl shaft 9 and is arranged adjacent to the pawl 3. One side of the pawl stopper 5 facing the pawl shaft 9 is provided with the detent 4. The detent 4 is in contact with the pawl 3. The pawl stopper 5 is configured to limit the force-applying direction of the detent 4, and the detent 4 is configured to make the pawl 3 to be in a fixed position with the separate state or locked state, so as to control the locked state and the separate state of the energy distribution mechanism 1. Two ends of the pawl shaft 9 respectively pass through the left connecting plate 13 and the right connecting plate 23, and are respectively provided with the pawl shaft positioning circlip 35.

Two ends of the ratchet wheel shaft 9 are respectively formed with a pawl shaft D-shaped shaft step 901, and a pawl circlip positioning shaft step 902 is formed at the position adjacent to the pawl shaft D-shaped shaft step 901. The two pawl shaft D-shaped shaft steps 901 respectively cooperate with the D-shaped holes on the left connecting plate 13 and the right connecting plate 23, so that the left connecting plate 13 and the right connecting plate 23 are fixed on two ends of the ratchet wheel shaft 9. The pawl shaft positioning circlip 35 is arranged in the pawl circlip positioning shaft step 902 to limit the movement of the pawl shaft 9 in the axial direction.

The pawl 3 includes a pawl body, a pawl restore cord connector 301, a pawl pushing curved surface body 302, and a pawl position-limiting protrusion 303. One end of the pawl body is rotatably connected to the pawl shaft 9. The pawl pushing curved surface body 302 is disposed at the other end of the pawl body and faces the ratchet wheel 6. The pawl position-limiting protrusion 303 is provided on the pawl pushing curved surface body 302. The pawl body is detachably connected to the ratchet wheel 6. The pawl restore cord connector 301 is connected to one end of the pawl restore cord 20, and the other end of the pawl restore cord 20 is connected to the ratchet wheel 6. The ratchet wheel claw 601 and the ratchet wheel restore cord connector 602 are arranged at intervals on the same side of the ratchet wheel 6. The other end of the pawl restore cord 20 is connected to the ratchet wheel restore cord connector 602. The ratchet wheel claw 601 is detachably connected to the pawl pushing curved surface body 302.

At the heel-strike phase, which is the initial gait stage, one side of the pawl position-limiting protrusion 303 away from the heel of the shoe is in contact with the detent 4. The pawl 3 is always in contact with the ratchet wheel 6 under the effect of contact force of the detent 4. Under the circumstances, the ratchet wheel 6 is in a one-way locking state and is only rotatable in the direction twisting the torsional springs, and the pawl restore cord 20 is in a relaxed state.

When the human body continues to walk to the maximum dorsiflexion state of the ankle joint, the ratchet wheel claw 601 rotates to a position in contact with the pawl pushing curved surface body 302, and pushes the pawl 3 outward. One side of the pawl position-limiting protrusion 303 close to the heel of the shoe is in contact with the detent 4. The pawl 3 is always separated from the ratchet wheel 6 under the effect of contact force of the detent 4. Under the circumstances, the energy stored in the energy distribution mechanism 1 is released, which drives the ankle joint power-assisted cord 10 to rotate, and provides power for the ankle joint to perform work.

The pawl restore cord connector 301 is connected to the ratchet wheel restore cord connector 602 through the pawl restore cord 20, and two ends of the pawl restore cord 20 are limited by the pawl restore cord aluminum sleeve 21. When the energy distribution mechanism 1 releases the energy, the ratchet wheel 6 rotates back to the original position, and is tightened by the pawl restore cord 20 when returning to the original position. The pawl 3 is pushed back to be in contact with the ratchet wheel 6. Under the circumstances, the ratchet wheel 6 is in a one-way locking state again, and enters the next working cycle.

Figure 7:
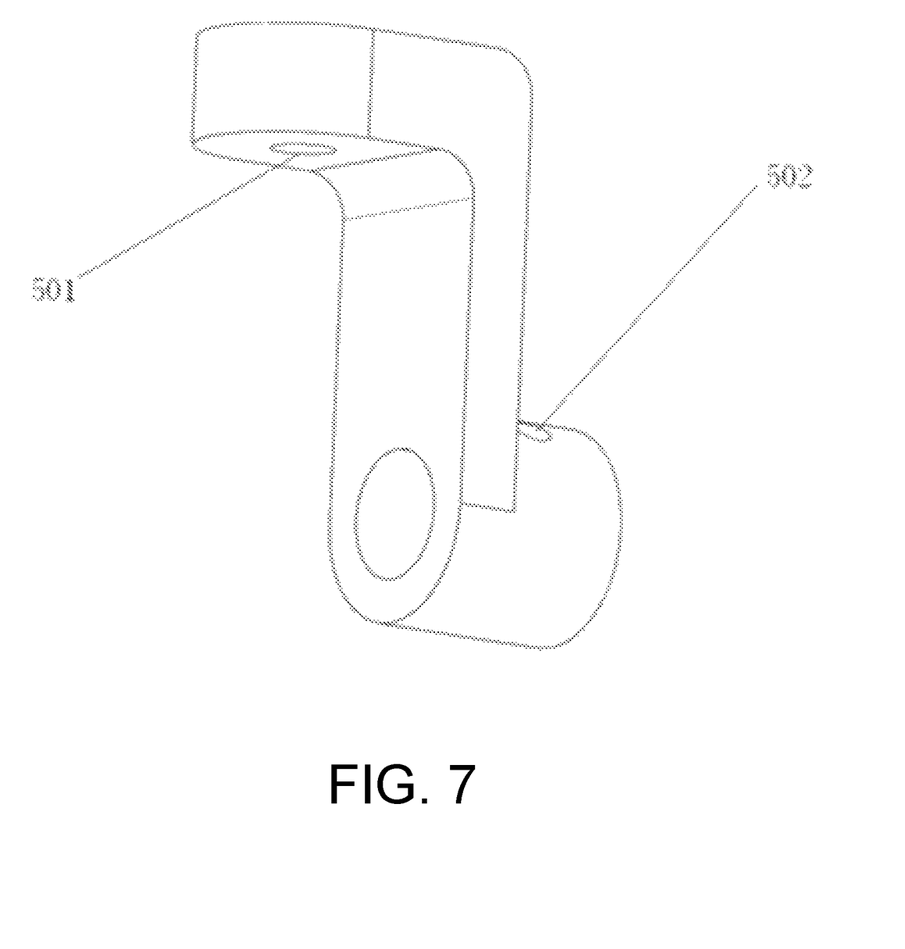
FIG. 7 is a schematic diagram of a pawl stopper of the locking assembly in FIG. 6.

Please refer to FIG. 7, the pawl stopper 5 is substantially Z-shaped, and two ends of the pawl stopper 5 are respectively provided with a detent positioning hole 501 and a pawl stopper fixing hole 502. The central axis of the detent positioning hole 501, the central axis of the pawl stopper fixing hole 502 are parallel to the longitudinal direction of the pawl stopper 5. The pawl stopper 5 is fixed on the pawl shaft 9 through the pawl stopper fixing hole 502, and the detent 4 is fixed on the pawl stopper 5 through the detent positioning hole 501.

Figure 8:
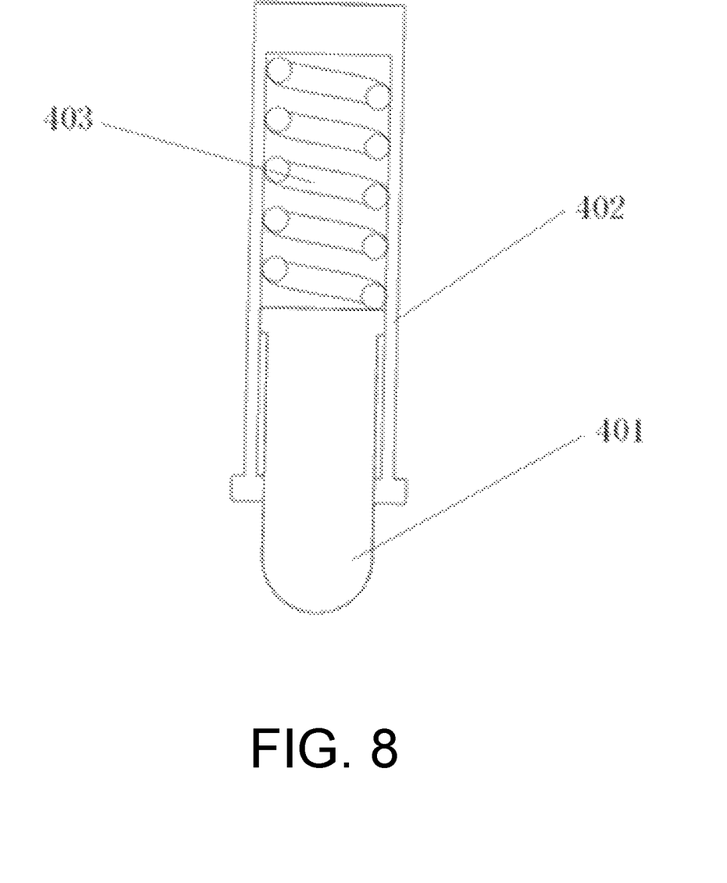
FIG. 8 is a schematic diagram of a detent of the locking assembly in FIG. 6.

Please refer to FIG. 8, the detent 4 includes a detent thimble 401, a detent housing 402, and a detent spring 403. One end of the detent housing 402 is provided with an opening. One end of the detent spring 403 is fixed on the other end of the detent housing 402, and the other end of the detent spring 403 is connected to one end of the detent thimble 401. The other end of the detent thimble 401 is in contact with the pawl position-limiting protrusion 303. The detent spring 403 is accommodated in the detent housing 402. The detent thimble 401 has an outward preload force under the action of the detent spring 403. When the pawl 3 is subjected to a preload force of the detent 4, the pawl 3 may only be in a locked state or a separate state.

Figure 9:
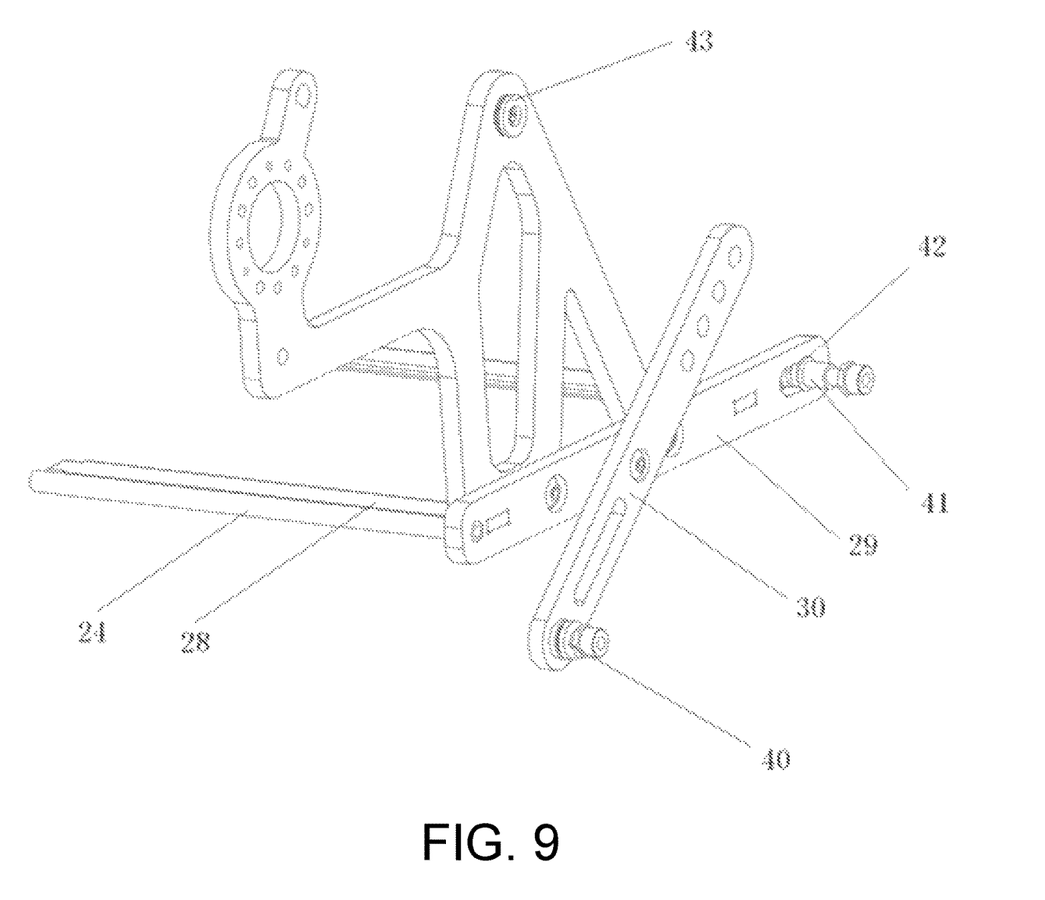
FIG. 9 is a partial schematic diagram of a strike-recipient mechanism of the passive exoskeleton based on energy flow characteristics of the foot-ankle complex in FIG. 2.
Figure 10:
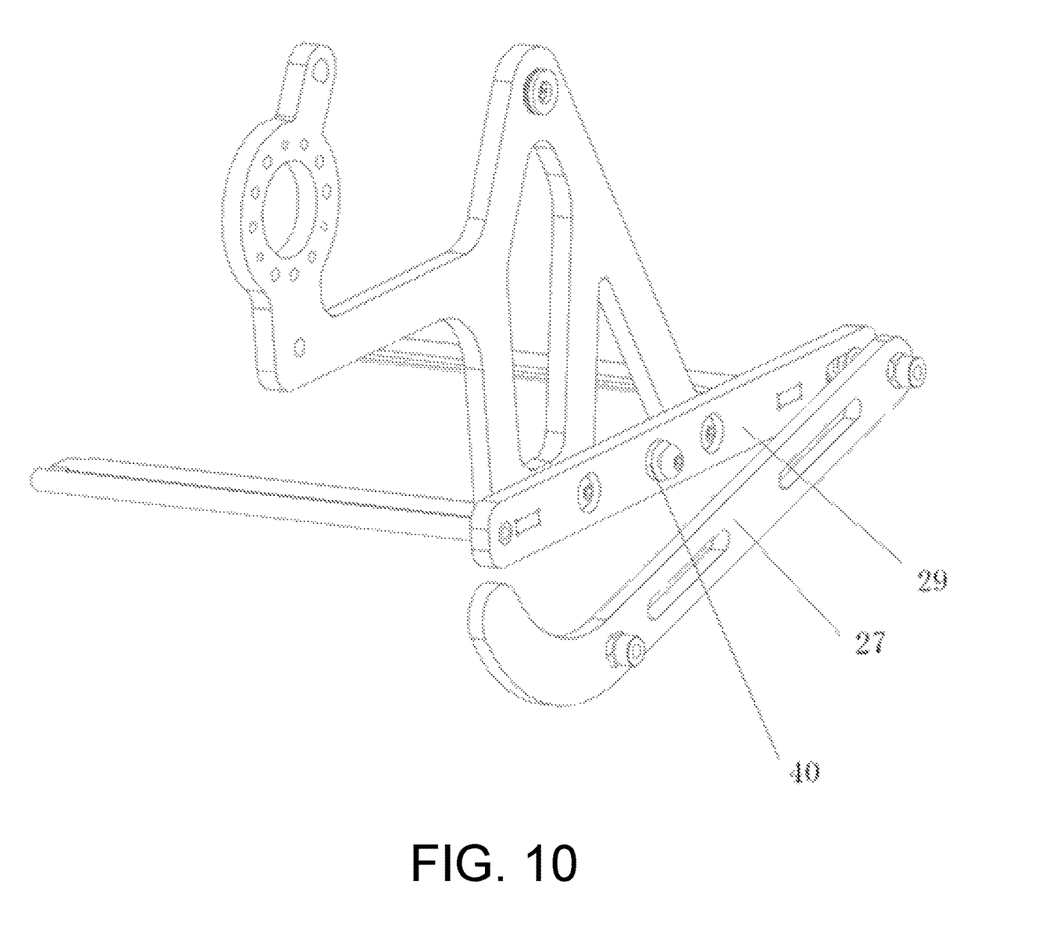
FIG. 10 is another partial schematic diagram of a strike-recipient mechanism of the passive exoskeleton based on energy flow characteristics of the foot-ankle complex in FIG. 2.

Please refer to FIG. 9 and FIG. 10, the strike-recipient mechanism II includes a reinforced carbon tube 24, a shoulder screw 25, slider connecting rods 27, a heel connecting frame 28, rear foot frames 29, connecting cranks 30, a strike-recipient mechanism thrust bearing 40, a slider connecting rod positioning sleeve 41, a rear foot frame flange bearing 42, and an ankle joint thrust bearing 43.

The reinforced carbon tube 24 and the heel connecting frame 28 are arranged at intervals, and two ends of the reinforced carbon tube 24 are respectively connected to the two rear foot frames 29. Two ends of the heel connecting frame 28 are also respectively connected to the two rear foot frames 29. The reinforced carbon tube 24 and the heel connecting frame 28 are fixedly connected to the bottom of the shoes 26. The left connecting plate 13 and the right connecting plate 23 are respectively fixed on the two rear foot frames 29 through bolts.

The middle part of the connecting crank 30 is connected to the rear leg frame 29 through the shoulder screw 25, which may rotate around the central axis of the shoulder screw 25. One end of the connecting crank 30 is connected to one end of the slider connecting rod 27 through the shoulder screw 25, and the other end of the slider connecting rod 27 is connected to a slot of the rear foot frame 29 through the shoulder screw 25. A rear foot frame flange bearing 42 is arranged between the corresponding shoulder screw 25 and the slot, so as to reduce the frictional force of the shoulder screw 25 moving in the slot. A slider connecting rod positioning sleeve 41 is disposed between the slider connecting rod 27 and the rear leg frame 29 to limit the position between the slider connecting rod 27 and the rear foot frame 29. The strike-recipient mechanism thrust bearing 40 is disposed between the slider connecting rod 27 and the connecting crank 30 to reduce frictional force. The other ends of the two connecting cranks 30 are respectively connected to the right foot guide wheel 34 and the left foot guide wheel 14 through the right foot energy storage cord 31 and the left foot energy storage cord 12. The left foot energy storage cord 12 and the right foot energy storage cord 31 are respectively connected to the corresponding connecting cranks 30 through the left foot energy storage cord aluminum sleeve and the right foot energy storage cord aluminum sleeve 19. The ankle joint power-assisted cord 10 is connected to the wearing fixing assembly through the ankle joint power-assisted cord aluminum sleeve 18.

The wearing fixing assembly includes two calf connecting plates 36, a calf fixing frame 37 and a calf velcro strap 38. The left connecting plate 13 and the right connecting plate 23 are respectively connected to one end of the two calf connecting plates 36 through the ankle joint shoulder screw 32, and the other end of the two calf connecting plates 36 is respectively connected to two ends of the calf fixing frame 37. The calf fixing frame 37 is arc-shaped, and the ankle joint power-assisted cord 10 is connected to the calf fixing frame 37. An ankle joint thrust bearing 43 is arranged between the calf connecting plate 36 and the left connecting plate 13, and an ankle joint thrust bearing 43 is also correspondingly arranged between the calf connecting plate 36 and the right connecting plate 23, so as to reduce frictional force. The calf connecting plates 36 on both sides are connected to the calf fixing frame 37 through the calf fixing bolt 1. Two ends of the calf fixing frame 37 are respectively connected with the calf velcro strap 38, and the entire passive exoskeleton is connected with the human calf through the calf velcro strap 38.

One end of the ankle joint power-assisted cord 10 passes through the hole in the middle of the calf fixing frame 2, and then the ankle joint power-assisted cord 10 is fixed through the ankle joint power-assisted cord aluminum sleeve 18. The other end of the ankle joint power-assisted cord 10 passes through the baffle 15 of the middle guide wheel 17 and is fixed on one side of the baffle 15, and the ankle joint power-assisted cord 10 is driven to move through the rotation of the middle guide wheel 17.

One end of the left foot energy storage cord 12 and one end of the right foot energy storage cord 31 respectively pass through the through holes on the two connecting cranks 30, and then are fixed through the foot energy storage cord aluminum sleeve 19, the other end of the left foot energy storage cord 12 and the other end of the right foot energy storage cord 31 pass respectively through the baffle plate 15 of the left foot guide wheel 14 and the baffle plate 15 of the right foot guide wheel 34, and are respectively fixed on one sides of the baffle plates 15. The movement of the connecting cranks 30 drive the left and right foot guide wheels to rotate. In this embodiment, the ankle joint power-assisted cord 10 has twice the bearing capacity of the foot energy storage cord.

Figure 1:
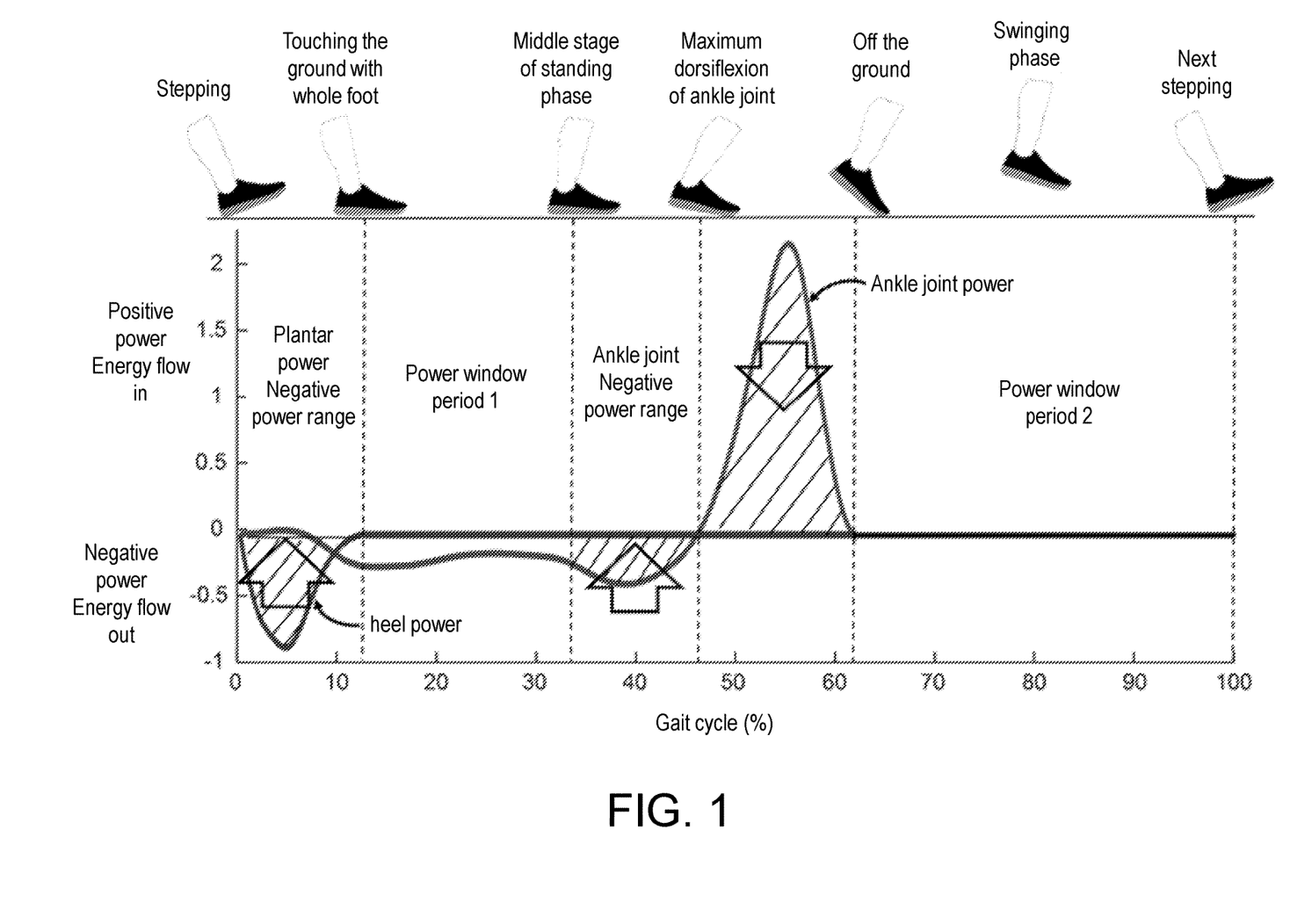
FIG. 1 is a diagram showing energy flow when human body walks according to the present disclosure.

When the first passive exoskeleton is in use, the first step of a foot to the next step is taken as a gait cycle during the walking process of human body. Taking one foot as an example, it may be seen from the energy flow of the foot that, in 0 to 12% of the gait cycle, the heel bottom does negative work, in 36% to 45% of the gait cycle, the ankle joint does negative work, and in 45% to 61% of the gait cycle, the ankle joint does negative work. In 61% to 100% gait cycle, this foot does not do work. In order to improve the walking efficiency of human body, reduce the energy dissipation during the heel-strike phase and the work performed by the ankle joint in the middle and late standing phase, by collecting and locking the energy in the stepping phase, the locked energy is released in the middle and late standing phase, power is provided to the ankle joint, thereby reducing the positive work performed by the ankle joint, decreasing the metabolic consumption of human body when walking, and improving the walking efficiency of human body.

The gait cycle starts with the stepping of one foot of human body. When the gait cycle is 0%, the connecting crank 30 of the strike-recipient mechanism II rotates around the middle shoulder screw 25 under the action of the human body's gravity, and the connecting crank 30 drives the energy distribution mechanism I to rotate through the right foot energy storage cord 31. Under the circumstances, the ankle joint power-assisted cord 10 is in a relaxed state, and the right foot energy storage cord 31 is in a state of energy storage and tension. At 12% to 36% of the gait cycle, the human ankle joint rotates, and the ankle joint power-assisted cord 10 is gradually tightened. At 36% to 45% of the gait cycle, the ankle joint continues to rotate. Under the circumstances, the ankle joint power-assisted cord 10 drives the energy distribution mechanism I to rotate again, and the foot energy storage cord is in a relaxed state under the circumstances. When the ankle joint is rotated to the maximum dorsiflexion state, the ratchet wheel claw 601 on the ratchet wheel 6 pushes the pawl 3 away, and the energy distribution mechanism I rotates back under the driving of the torsional spring to restore the energy distribution mechanism I and the strike-recipient mechanism II, and provide power to the ankle joint. Under the circumstances, both the foot energy storage cord and the ankle joint power-assisted cord 10 are in a tightened state.

The lower part of the strike-recipient mechanism II is fixed on the bottom of the shoes 26, and the upper part is fixed on the human calf through the calf connecting plate 36, the calf fixing frame 37 and the calf velcro strap 38. The energy distribution mechanism I is located above the heel of the shoes 26, and the energy distribution mechanism I is connected with the strike-recipient mechanism II.

The passive exoskeleton provided by the present disclosure has two structures, namely left and right structures. First, the user needs to wear the shoes 26 of the exoskeleton on the left and right feet of the human body, and fix the upper parts of the two exoskeletons on the left and right calves of the human body respectively through the calf velcro strap 38. After the power-assisted exoskeleton is fixed on the human body, the human body may walk with a normal walking gait. The two feet of the human body move alternately between the swing phase and the standing phase. When the exoskeleton strike-recipient mechanism of one foot just touches the ground, the touched position is the initial working position, and this stage is defined as 0% of the gait cycle. When the human body continues to walk to 12% of the gait cycle, the sole of the shoe is gradually level with the ground. The strike-recipient mechanism III acts under the action of the huma' body's gravity, reduces the impact of the heel on the ground when the human body is walking, and transmits the energy to the energy distribution mechanism I through the foot energy storage cord so that the energy is stored in the left torsional spring 16 and the right torsional spring 19. When the human body continues to walk to 45% of the gait cycle, the ankle joint power-assisted cord 10 first begins to tighten gradually, and then continues to collect the negative work done by the ankle joint to drive the energy distribution mechanism I to continue to rotate. When walking proceeds to 45% of the gait cycle, the ankle joint reaches the maximum dorsiflexion state. Under the circumstances, the ratchet wheel claw 601 of the ratchet wheel 6 separates the pawl 3, and the energy distribution mechanism I will release the stored energy to provide power to the ankle joint for the push-off phase of the foot. When the push-off phase of the human foot ends, from the moment that the feet leave the ground and begins to transition to the swing phase, the ankle joint no longer performs work at this stage. The power-assisted exoskeletons of the two feet of the human body repeat the above actions alternately, which may reduce the impact on the sole of the foot during the heel-strike phase, and provide power to the ankle joint when the foot pushes off from the ground, thereby improving the walking efficiency of the human body.

Those skilled in the art can easily understand that the above descriptions are only preferred embodiments of the present disclosure, and are not intended to limit the present disclosure. Any modifications, equivalent replacements and improvements made within the spirit and principles of the present disclosure, and so on should be included within the protection scope of the present disclosure.

What is claimed is:

1. A passive exoskeleton based on energy flow characteristics of a foot-ankle complex, the passive exoskeleton comprising:
    a first passive exoskeleton, wherein the first passive exoskeleton comprises an energy distribution mechanism, a strike-recipient mechanism and a wearing fixing assembly, the energy distribution mechanism is connected to the strike-recipient mechanism, and the energy distribution mechanism is further connected to the wearing fixing assembly;
    when in use, the wearing fixing assembly is fixed on a calf of a human body, and the strike-recipient mechanism is fixed on a foot of the human body; the strike-recipient mechanism deforms with a walking gait of the human body and collects a negative work generated during a heel-strike phase; the energy distribution mechanism comprises a ratchet wheel shaft, a left torsional spring, a right torsional spring and a middle guide wheel respectively sleeved on the ratchet wheel shaft, the middle guide wheel is connected to the wearing fixing assembly through an ankle joint power-assisted cord; the ratchet wheel shaft is connected to the strike-recipient mechanism, the strike-recipient mechanism drives the ratchet wheel shaft to rotate, and the ratchet wheel shaft drives the left torsional spring, the right torsional spring and the middle guide wheel to rotate, the left torsional spring and the right torsional spring store an energy transmitted by the strike-recipient mechanism through elastic deformation and release the stored energy through elastic recovery to assist an ankle joint to push-off.

2. The passive exoskeleton based on the energy flow characteristics of the foot-ankle complex according to claim 1, wherein the energy distribution mechanism comprises a left connecting plate, a right connecting plate, a left foot guide wheel, a right foot guide wheel, a ratchet wheel, a left torsional spring baffle and a right torsional spring baffle, two ends of the ratchet wheel shaft respectively pass through the left connecting plate and the right connecting plate; the left foot guide wheel, the left connecting plate, the left torsional spring, the middle guide wheel, the ratchet wheel, the right torsional spring baffle, the right torsional spring, the right connecting plate and the right foot guide wheel are sequentially sleeved on the ratchet wheel shaft along an axial direction of the ratchet wheel shaft.

3. The passive exoskeleton based on the energy flow characteristics of the foot-ankle complex according to claim 2, wherein the left foot guide wheel and the right foot guide wheel are connected to the strike-recipient mechanism respectively through a left foot energy storage cord and a right foot energy storage cord, and the strike-recipient mechanism is a symmetrical structure.

4. The passive exoskeleton based on the energy flow characteristics of the foot-ankle complex according to claim 3, wherein the strike-recipient mechanism comprises a reinforced carbon tube, a heel connecting frame, rear foot frames, slider connecting rods and connecting cranks, the two rear foot frames are arranged at intervals and are respectively connected to the left connecting plate and the right connecting plate; two ends of the reinforced carbon tube are respectively connected to the two rear foot frames; two ends of the heel connecting frame are respectively connected to the two rear foot frames; middle portions of the two connecting cranks are respectively and rotatably connected to middle portions of the two rear foot frames; one ends of the two connecting cranks are respectively connected to the left foot energy storage cord and the right foot energy storage cord, and the other ends of the two connecting cranks are respectively and rotatably connected to one ends of the two slider connecting rods, the other ends of the two slider connecting rods are respectively and rotatably connected to one ends of the two rear foot frames away from the reinforced carbon tube.

5. The passive exoskeleton based on the energy flow characteristics of the foot-ankle complex according to claim 4, wherein the reinforced carbon tube and the heel connecting frame are connected to shoe.

6. The passive exoskeleton based on the energy flow characteristics of the foot-ankle complex according to claim 2, wherein the energy distribution mechanism further comprises a pawl, a detent, a pawl stopper, and a pawl shaft, two ends of the pawl shaft are respectively connected to the left connecting plate and the right connecting plate; the pawl stopper is fixed on the pawl shaft, the pawl is rotatably arranged on the pawl shaft, and one end of the detent is connected to the pawl stopper, and the other end of the detent is movably connected to one end of the pawl; the other end of the pawl is detachably connected to the ratchet wheel; the pawl engages or is disengaged from the ratchet wheel to make the ratchet wheel to be in a locked state or an open state, when the ratchet wheel is in the locked state, the ratchet wheel is rotatable unidirectionally; when the ratchet wheel is in the open state, the ratchet wheel is rotatable bidirectionally.

7. The passive exoskeleton based on the energy flow characteristics of the foot-ankle complex according to claim 6, wherein the pawl stopper is Z-shaped, one end of the pawl stopper is fixed on the pawl shaft, and the other end of the pawl stopper is connected to the detent; the detent is elastically deformed to limit a position of the pawl.

8. The passive exoskeleton based on the energy flow characteristics of the foot-ankle complex according to claim 7, wherein the detent comprises a detent housing, a detent thimble, and a detent spring, one end of the detent housing is connected to one end of the pawl stopper away from the pawl shaft, one end of the detent spring is connected to the detent housing, the other end of the detent spring is connected to one end of the detent thimble, and the other end of the detent thimble protrudes out of the detent housing and is movably connected to the pawl.

9. The passive exoskeleton based on the energy flow characteristics of the foot-ankle complex according to claim

8, wherein the pawl comprises a pawl body, a pawl restore cord connector, a pawl pushing curved surface body and a pawl position-limiting protrusion, one end of the pawl body is rotatably connected to the pawl shaft, and the pawl pushing curved surface body is arranged on the other end of the pawl body and faces the ratchet wheel; the pawl position-limiting protrusion is arranged on the pawl pushing curved surface body; the pawl body is detachably connected to the ratchet wheel; the pawl restore cord connector is connected to one end of a pawl restore cord, and the other end of the pawl restore cord is connected to the ratchet wheel.

10. The passive exoskeleton based on the energy flow characteristics of the foot-ankle complex according to claim 9, wherein a ratchet wheel claw and a ratchet wheel restore cord connector are arranged at intervals on the same side of the ratchet wheel, the other end of the pawl restore cord is connected to the ratchet wheel restore cord connector, and the ratchet wheel claw is detachably connected to the pawl pushing curved surface body; the wearing fixing assembly is a symmetrical structure, and two opposite sides of the wearing fixing assembly are respectively and rotatably connected to the left connecting plate and the right connecting plate.

\* \* \* \* \*